| United States Patent [19] | [11] 3,717,584 |
| --- | --- |
| Byler et al. | [45] Feb. 20, 1973 |

[54] METHOD FOR PREPARING RARE EARTH OXIDE PHOSPHORS

[75] Inventors: William H. Byler, Landing; James J. Mattis, Long Valley, both of N.J.

[73] Assignee: U.S. Radium Corporation

[22] Filed: June 11, 1970

[21] Appl. No.: 45,402

Related U.S. Application Data

[63] Continuation-in-part of Ser. No. 685,219, Nov. 22, 1967, abandoned.

[52] U.S. Cl. .................................252/301.4 R
[51] Int. Cl. ................................C09k 1/10
[58] Field of Search ................252/301.4 R

[56] References Cited

UNITED STATES PATENTS

| 3,457,184 | 7/1969 | Kabayashi et al. | 252/301.4 R |
| 3,458,451 | 7/1969 | Kabayashi et al. | 252/301.4 R |
| 3,273,806 | 9/1966 | Aoki et al. | 252/301.4 X |

*Primary Examiner*—Oscar S. Vertiz
*Assistant Examiner*—J. Cooper
*Attorney*—Pennie, Edmonds, Morton, Taylor and Adams

[57] ABSTRACT

Rare earth phosphors with excellent optical and screening properties and optimum particle size distribution for the preparation of color television tubes are prepared by treating rare earth salts such as oxalate, tartrate or sulfate containing at least one rare earth metal, and an activator, with a caustic solution, firing the caustic treated rare earth salts to high temperatures in a non-reducing atmosphere to form oxides, and thereafter wet milling, washing, and drying to prepare said phosphors. The phosphors thus obtained contain a small amount of retained alkali up to about 3 percent by weight, at least a major portion of which can be removed by the sequential treatment including the steps of refining, washing, neutralizing the slurry with acid and drying. The preferred phosphors have the general formula $$[R_{1-x}Eu_x]_2O_3 + (Li_{1-m}Na_m)$$

wherein R is $Gd_{1-n}Y_n$, x is a value from 0.02 to 0.10, m and n each is a value from zero to 1 and $(Li_{1-m}Na_m)$ is the retained alkali, the weight of which is preferably less than about 1.5 percent.

12 Claims, 3 Drawing Figures

FIG. I
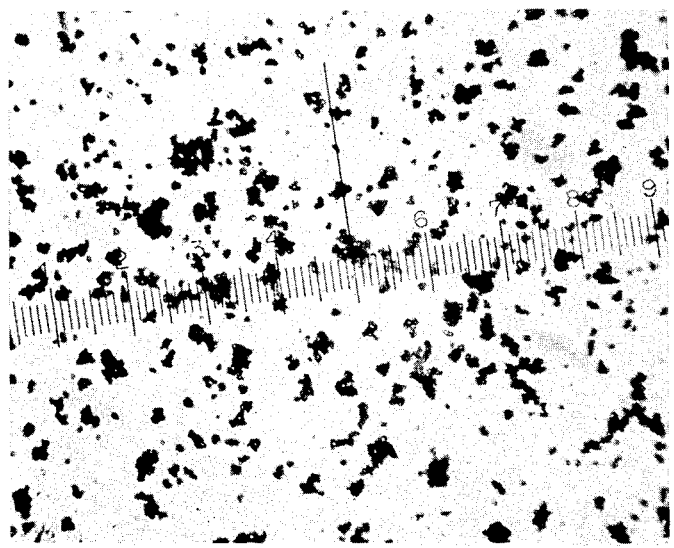
FIG. 2
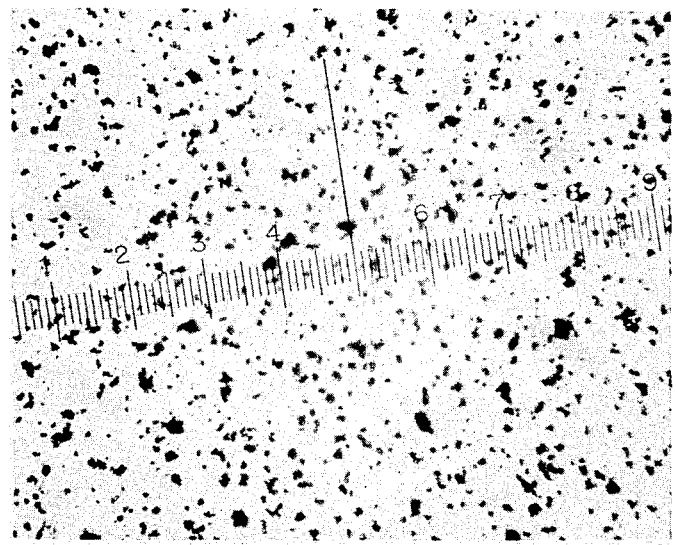

METHOD FOR PREPARING RARE EARTH OXIDE PHOSPHORS

RELATED APPLICATION

This application is a continuation-in-part of our copending application Ser. No. 685,219, filed Nov. 22, 1967 now abandoned.

BACKGROUND OF THE INVENTION

1. Field of the Invention

This invention relates to rare earth phosphors, and more particularly to a method for preparing the phosphors (generally in association with a rare earth activator) which involves a caustic treatment, and to the resultant rare earth phosphors (and associated activator) with retained alkali metal or metals. The term "rare earths" as used in the present specification refers to yttrium and scandium plus the metals in Group III of the periodic table generally classified as lanthanide rare earths, to wit: lanthanum, cerium, praseodymium, neodymium, samarium, europium, gadolinium, terbium, dysprosium, holmium, erbium, thulium, ytterbium and lutetium. The term "phosphor" refers to a material which is capable of exhibiting luminesence when subjected to appropriate excitation. The term "rare earth activator" refers to compounds of rare earth elements which may be combined with other rare earth compounds to activate luminesence thereof and used as activators, including, for example, compounds of europium, terbium, erbium, thulium, dysprosium, ytterbium, praseodymium and gadolinium.

2. Description of the Prior Art

Luminescent properties of certain rare earth containing compositions have long been recognized. In recent years, rare earth phosphors have received considerable attention and are the subject of many intensive investigations. The recent interest is due partly to the discovery that certain rare earth phosphors, particularly the oxygen bearing phosphors (oxyphosphors) can be used advantageously as cathodo-luminescent coatings for color television tubes. In general, the rare earth phosphors are in the form of a solid solution having a matrix of rare earth compounds such as a rare earth oxide or vanadate and an activator which is commonly called a "dopant" and generally is also a rare earth element. The phosphor usually contains a trace amount of other elements which may be impurities from the starting materials or accidentally introduced into the phosphor during its preparation or which may be added thereto purposefully to improve the properties of the final phosphor.

The effectiveness of the activator is dependent to a large extent on its intimate relation within the rare earth matrix. To ensure the formulation of an intimate mixture, rare earth phosphor manufacturers may prefer to dissolve into an acid solution the rare earth element in the form of an oxide, together with the activator, to form a homogeneous solution. The rare earth element and the activator are then coprecipitated out in the form of oxalates, hydroxides or carbonates. The precipitates are recovered and fired to a high temperature to decompose the salts into mixed oxides in powder form. This finely divided, reactive form is favorable for reaction with certain acid oxides to synthesize such oxygen-dominated and europium-activated phosphors as yttrium vanadate, gadolinium vanadate, yttrium tungstate, yttrium germanate, gadolinium aluminate, etc., and conditions can be adjusted to yield desirable crystal growth and particle size distribution. The phosphors thus synthesized may be used as luminescent coatings for color television tubes and other applications.

Certain oxide phosphors prepared by the aforesaid precipitation and decomposition method are also efficient luminescent materials, when properly excited, with emission of visible light in the desirable range of wave length. Due to the small crystal size of the oxide phosphors, they are difficult to handle and are limited in their applications. Attempts to grow the oxide phosphors by increasing the firing temperature and duration have not been successful. Such treatment does not suffice to control the crystal growth properly, and leads to wide particle size distribution, or results in crystal growth at the expense of lowering the phosphor's optical properties. Failure to obtain controlled crystal growth also limits application of the oxide phosphors as prephosphors for preparing some other types of rare earth phosphors (such as the preparation of rare earth oxysulfide phosphors) when subsequent steps for such preparation does not favor desirable crystal growth.

SUMMARY OF INVENTION

We have discovered that controlled crystal growth for rare earth oxide phosphors can be obtained with the process of this invention. Broadly stated, the process comprises the steps of treating a rare earth salt intimately mixed with an activator with a caustic solution, preferably lithium, sodium or potassium hydroxide solution, and thereafter subjecting the thus treated salt to a high temperature treatment in a preselected atmosphere to form the phosphor. The rare earth salts suitable for the process of this invention are those capable of being decomposed to form the corresponding rare earth oxide.

Preferably, these rare earth oxide phosphors are prepared by the process which comprises the steps of preparing a homogeneous solution of at least one rare earth metal and an activator. The rare earth metal and the activator preferably are then coprecipitated. After the precipitates are recovered, they are treated with a caustic solution. The thus treated precipitates are then heated in a preselected atmosphere to form the phosphor.

The firing is carried out in an essentially non-reducing atmosphere and in sequential steps including firing the caustic treated precipitates initially at a temperature sufficiently high for the formation of oxides, breaking up any aggregates formed in the initial firing operation, washing and drying the oxide, and thereafter refiring the dry oxide to above about 1000° F. The caustic solution for treating the precipitates preferably is a solution of NaOH, LiOH, KOH or a mixture of these alkali hydroxides.

The rare earth phosphors of the invention contain a small amount of retained alkali metal from the caustic solution used in the caustic treatment, preferably lithium, sodium, or potassium, or a mixture thereof. They exhibit controlled grain growth properties and optimal optical properties. They comprise a rare earth oxide matrix having a rare earth activator therein, and a small amount of retained alkali metal which is in an amount ranging from 0.002 percent in the case of lithium or from 0.006 percent in the case of sodium or potassium up to 1.5 percent by weight of the phosphor. These phosphors have an average crystal size in the range from 3 to 30 microns.

BRIEF DESCRIPTION OF THE DRAWINGS

The accompanying two sheets of drawings show photomicrographs of europium-activated gadolinium oxide crystals.

The crystals shown in FIG. 1 have retained alkali in the matrix and were prepared according to a procedure to be described hereinafter in Example I.

Figure 3:
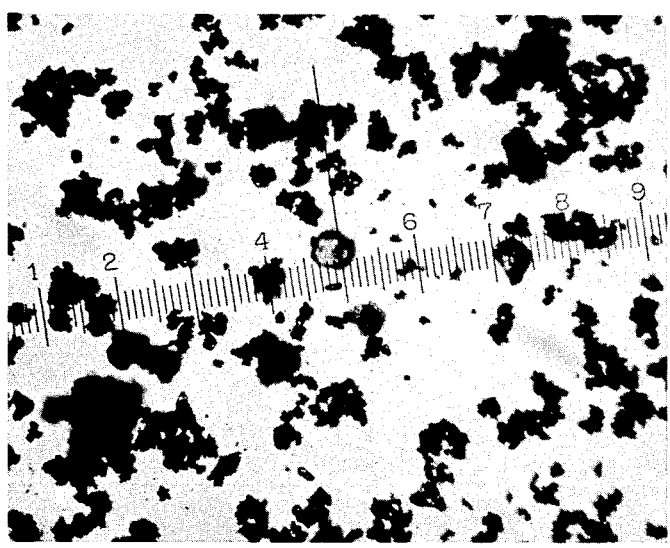

The crystals shown in FIG. 2 do not have retained alkali in the matrix and were prepared in a similar manner as the crystals in FIG. 1 with the exception that the caustic treatment was omitted.

The crystals shown in FIG. 3 also have retained alkali in the matrix and were prepared in accordance with a procedure described in Example II.

DESCRIPTION OF THE PREFERRED EMBODIMENTS

Any of the rare earth elements (as defined above) may be used in preparing oxide phosphors in accordance with the invention, provided they are used in a form capable of functioning as a phosphor. That is to say, they must yield an oxide which is transparent or translucent to the wave length of the radiation emitted. For example, very dark or black oxides such as the oxide of tetravalent praseodymium are not satisfactory for phosphors which are to emit visible light. The selection of suitable rare earth elements for phosphors for particular uses is well within the competence of phosphor chemists; but in general the use of the light colored oxides of the trivalent rare earth elements lanthanum, gadolinium, lutetium, yttrium and scandium are preferred.

Similarly, many of the rare earth elements (as defined above) may be used as activator in a rare earth phosphor according to the invention. Not all rare earth elements may be used to activate any rare earth oxide phosphor to emit radiation of any wave length, but those that may be used to activate one of the phosphors specified above include praseodymium, neodymium, samarium, europium, gadolinium, terbium, dysprosium, holmium, erbium, ytterbium, and thulium. The selection of particular activators for particular phosphor compositions to promote emission of radiation of particular wave lengths is not a part of this invention. Rather, the invention draws on the knowledge of the art to make such selection. So far as this invention is concerned, any suitable rare earth activator or any suitable combination of them may be used.

To carry out the process of this invention the initial steps of forming an intimate mixture containing the rare earth metal values for the phosphor and the activator cations in predetermined proportions may be accomplished by conventional techniques well known to one skilled in the art. Thus, one may obtain a homogeneous solution by dissolving therein the soluble compounds of rare earth elements as well as the activator. In general, the oxides, sulfates, nitrates and chlorides are the rare earth compounds most commonly used to prepare the homogeneous solution. Because of the relative insolubility of the rare earth oxides, acidic solutions are generally used for preparing the homogeneous solutions. We prefer to use inorganic mineral acids such as hydrochloric acid, sulfuric acid and nitric acid for this purpose.

The amount of rare earth salt and activator that is dissolved in the solvent is not critical. The maximum amount of rare earth that can be used is generally governed by the solubility of the compound in the solvent. When a mineral acid is used as a solvent, the concentration of the acid dictates the concentration of the solutes therein.

Usually, the higher the concentration, the smaller the volume required to dissolve a certain amount of rare earth compounds and activators. We found it to be advantageous to obtain an acidic solution with a pH in the range between 1 and 4 if the precipitate subsequently obtained is to be in the form of an oxalate.

Advantageously the proportion of the rare earth and the activator in the solution is in the same stoichiometric ratio as in the phosphor. The amount of activator in the phosphor varies within a wide range depending on a number of factors. For some of the rare earth oxide phosphors, the amount by weight may be within the range of 0.02 to 0.10.

The rare earth element and the activator are coprecipitated from the homogeneous solution by adding thereto a precipitating agent well known in the art. Thus, the coprecipitation may be accomplished by adding to the solution oxalic acid, tartaric acid, and ammonium carbonate to precipitate therefrom oxalates, tartrate and carbonate, respectively.

In the process of this invention, we prefer to use oxalic acid to coprecipitate the desirable metal values fro an acidic solution. This may be performed, for example, by adding an oxalic solution to the acidic solution containing the rare earth values and the activator. The mixing of oxalic with the acidic solution may be carried out over a wide temperature range, e.g., 10°C. – 70°C. The pH of the resultant aqueous mixture, however, should be adjusted so that it is below the value at which the rare earth hydroxide precipitates are formed. In most instances the pH is advantageously kept at a lower value which can preferentially precipitate the rare earth oxalate and not the impurities; thus, it is an effective means for controlling the impurities in the final composition of the phosphor.

The initial concentration of the acidic solution, the amount of the oxalic acid added thereto, the pH of the final solution and the temperature for the coprecipitation all have influences on the type of crystals obtained and the size of the crystals. In general, it is advantageous to adjust these variables so as to allow a coprecipitation that will produce phosphors with optimal properties.

Instead of oxalic acid, tartaric acid may be used effectively for coprecipitation of rare earth values and the activator. When tartaric acid is used, however, the pH should be slightly higher than that used with the oxalic acid. The pH value required, nevertheless, is still below the value at which the rare earth metal values are precipitated as hydroxides.

The precipitates thus obtained are recovered by filtration and followed by washing. These precipitates which are a mixture of salts containing rare earth cations and ions of the activators, are now ready for caustic treatment.

Although the invention has been described particularly with reference to coprecipitation of the rare earth phosphor and activator, other procedures for making an intimate mixture of these substances may be employed. For example, the phosphor rare earth and of the activator rare earth may be cocrystallized from the solution, yielding a crop of crystals in which the phosphor and activator are intimately mixed in suitable proportions. The cocrystallized product may then be subjected to the caustic treatment which characterizes the method of the invention.

Advantageously, the treatment is performed by reslurrying the precipitates or crystals in a caustic solution. In the case of crystals, the volume of caustic solution should be limited to minimize redissolving of the crystals. While any caustic solution has beneficial results in promoting crystal growth in subsequent firing operations, the specific alkali hydroxide or mixture of alkali hydroxides is significant in determining the final crystal size and the optical properties of the phosphors subsequently recovered. Lithium hydroxide, sodium hydroxide, and potassium hydroxide are the caustics which in general are used, but the invention does not exclude the use of the relatively rarer alkali caustics (e.g., rubidium hydroxide and cesium hydroxide). In general, lithium hydroxide is most effective in promoting crystal growth, and sodium hydroxide and potassium hydroxide are relatively less so.

The selection of the caustic solution, concentration, and temperature for the treatment is dependent also on the rare earth used. For example, it is easier to grow lanthaum oxide crystals than gadolinium oxide crystals and the latter is in turn easier to grow than yttrium oxide crystals. It is, therefore, apparent that for a given crystal growth, the caustic treatment for lanthanum is less severe in comparison with the requirement for yttrium. The selection of variables for the caustic treatment, however, is not completely based on the crystal growth. The caustic solution and the treatment conditions should be chosen to provide, in addition to crystal growth, optimal optical properties.

The selection of variables in the caustic treatment may be guided to a certain extent on chemical grounds. For example, lanthanum is more basic than gadolinium which leads to differences in solubility, in size of precipitated crystals under given conditions, in reactivity of oxalate with caustic, in decomposition temperature, in crystal habit and in growth rate. Because gadolinium and yttrium oxides are less basic, they tend not to grow as readily as lanthanum oxide; hence conditions for the caustic treatment are different from those for lanthanum and they are selected to favor growth and optimum retention of alkali. The alkali or alkali metals selected must also not hinder but be favorable in relation to phosphor brightness. Thus, we found lithium hydroxide which provides the best crystal growth is favored for yttrium oxide and sodium hydroxide which is not as effective as LiOH for promoting crystal growth, may be used alone or in combination with lithium hydroxide or potassium hydroxide for the growth of gadolinium oxide crystals.

As briefly described hereinabove, it is possible to use a caustic solution containing a mixture of alkali hydroxides. For example, we found a mixture of lithium hydroxide and sodium hydroxide is effective for controlling the crystal growth in a mixed oxide phosphor such as in a $Gd_2O_3$—$Y_2O_3$—$Eu_2O_3$ system without having a deleterious effect on the luminescent efficiency of the resultant phosphors. Indeed, it is possible to prepare phosphors across the whole spectrum of the $Gd_2O_3Y_2O_3$ mixture and to control the particle size by the adjustment of the LiOH—NaOH ratios in the caustic solution which leads to the formation of the phosphor of the following formula

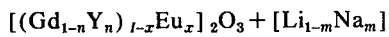
$[(Gd_{1-n}Y_n)_{1-x}Eu_x]_2O_3 + [Li_{1-m}Na_m]$ in which $m$ and $n$ each can vary from zero to 1, $[Li_{1-m}Na_m]$ is the retained alkali in an amount less than about 1.5 percent by weight and $x$ is in the range between 0.02 to 0.1.

In addition to the specific influence of a particular alkali hydroxide or a mixture of alkali hydroxides on the crystal growth and optical properties of the oxyphosphors subsequently recovered, the concentration of the caustic solution, and the duration and temperature of the treatment also have definite effects on the final properties of the phosphors. The rule to follow is that high concentration and temperature and a longer treatment period promote greater crystal growth. For commercial production we found a caustic solution containing 5 to 35 percent by weight of alkali hydroxide or hydroxides in relation to contained rare earth oxides may be advantageously added to the slurry in the caustic treatment step of the process carried out at a temperature in the range between 20°C. and 70°C. and for a duration between 20 minutes and 5 hours. The final caustic concentration of the slurry may be in the range between 1 to 10 percent by weight. Subsequent to the caustic treatment, the precipitate is again recovered by filtration. The washed crystals are then dried and are now ready for firing to form the oxide phosphor.

To promote optimal crystal growth, we prefer to first decompose the crystal to form the oxide and then fire a second time at a higher temperature. The temperatures are raised to 1000° to 1500°F. for a period of 1 to 3 hours which causes the precipitates to decompose and thereafter the temperature is further raised to 2000° to 2400°F. for 2 to 10 hours to insure complete conversion of the oxalates to oxides and to grow the crystal to the desired size range.

After the high temperature firing, the fine oxide crystals are in the form of relatively large loosely bonded agglomerates. Wet milling gently with water breaks up the agglomerates. After milling the oxide crystals in powder form are repeatedly washed.

For the conversion of rare earth tartrates to oxides, similar firing procedures may be followed. The firing and refiring temperatures and durations again depend on the rare earth oxides and the ultimate crystal size. It should be noted that for both oxalates and tartrates, the firing temperatures are not very critical. The temperatures, however, should be sufficiently high for the purposes of conversion and crystal growth.

If the precipitates are rare earth carbonates, which decompose to form rare earth oxides in a similar manner as oxalates as depicted below

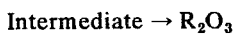

the above-described firing procedure can be advantageously used after caustic treatment to convert the carbonates to oxides and to promote crystal growth. The selection of the firing temperatures should be compatable with the rare earth element and to the final crystal size desired.

After the final refiring operation, the phosphor is preferably washed with water and the slurry is neutralized with a dilute acid. The washing and neutralizing steps are used to insure that all alkali which is not retained in the phosphor is removed or otherwise neutralized.

The rare earth oxide phosphors in accordance with this invention have, as previously stated, retained alkali in their matrix. The precise manner in which the alkali is associated with and bonded to the rare earth oxide matrix is not completely clear. However, we have found that the alkali which is retained with the rare earth oxide is important to achieve controlled crystal growth and optimum phosphor brightness. The exact amount of retained alkali which is necessary to impart the superior properties to the rare earth phosphor varies. Generally, we have found that the amount of retained alkali may be as low as 0.002 percent in the case of lithium, or 0.006 percent in the case of sodium or potassium, by weight of the phosphor, or as high as 1.5 percent by weight of the phosphor. However, an amount of retained alkali in the range of about 0.005 to 0.012 percent in the case of lithium, or 0.06 to 0.13 percent in the case of sodium, or 0.02 to 0.09 percent in the case of potassium, by weight of the phosphor in each case is eminently suitable and is in general preferred.

To illustrate the superior properties of the rare earth oxide phosphors with retained alkali as compared with rare earth oxide phosphors without retained alkali, samples of both such phosphors were coated on a conventional cathode tube and were tested for brightness. The rare earth oxide phosphors with retained alkali showed an average brightness 11 to 16 percent greater than the rare earth oxide phosphors without the retained alkali under the same excitation conditions.

The exact amount of alkali retained in the phosphor is determined by many factors including the concentration of the caustic solution used to prepare the phosphor, the duration and temperature of the caustic treatment, the subsequent firing and refiring of the temperatures, the number of refiring cycles and the type of phosphor which is used. In general, we found the amount of retained alkali may be as high as 1.5 percent by weight of the phosphor. This large amount of alkali, however, is still far below that which is required to form an alkali metal salt of the formula $ARO_2$, wherein A is an alkali metal such as lithium or sodium and R (as above) is a rare earth or a mixture of rare earths such as a mixture of europium and gadolinium or a mixture of yttrium and europium. Such alkali metal compounds (e.g. lithium yttrate and sodium gadolinate) have been proposed for use as rare earth activated phosphors, but have been found to be unstable (J. Electrochem. Soc., 114, 252; same J., 116, 663).

We have run many experiments using the process of this invention to prepare oxide phosphors. These experiments show that alkali is retained in these phosphors after the initial high temperature firing, e.g., 2150°F. and that a substantial fraction of this alkali is released by refiring one or more times at a lower temperature, e.g., 1400 – 1800°F. Following wet milling, washing and drying. The amount of released alkali is determined by re-slurrying the phosphors in water and titrating them with dilute nitric acid. Samples of similar phosphors which have not been subjected to caustic treatment show no excess alkalinity whereas the caustic treated samples have shown amounts up to as high as 3 percent by weight of total alkali released by repeat firing. The phosphor as it stands after the high temperature firing, wet milling, washing, and drying may be an efficient one but it is found generally that improvement results from refiring. Repeated refiring in some cases releases additional alkali and may still further improve efficiency but this is not necessarily true. In all cases, atomic absorption analysis shows significantly more alkali retained than control samples prepared without the use of caustic. The following are some atomic absorption analysis results:

TABLE I

| | Li(ppm) | Na(ppm) | K(ppm) |
|---|---|---|---|
| 1. $Gd_2O_3$: Eu (non-caustic control) | >1 | 48 | 10 |
| 2. $Gd_2O_3$: Eu (non-caustic but with 10% $Na^+$ added at pptn.) | | 50 | |
| 3. $Gd_2O_3$: Eu (NaOH treated) | | 63 | |
| 4. $Gd_2O_3$: Eu (NaOH treated) | | 150 | |
| 5. $Gd_2O_3$: Eu (LiOH + NaOH treated) | 65 | | |
| 6. $Gd_2O_3$: Eu (KOH treated) | | | 62 |
| 7. $Y_2O_3$: Eu (non-caustic control) | >1 | 55 | 7 |
| 8. (60) $Y_2O_3$: (40) $Gd_2O_3$: Eu (NaOH + LiOH treated) | 19 | 870 | |
| $Y_2O_3$: Eu (LiOH + NaOH treated) | 79 | 370 | |

Samples 3, 4, 5, 6 and 8 were refired to the point of essentially no further release of alkali as shown by titration.

Sample 2 was processed the same as sample 1 except 10% $Na^+$ was added as $NaNO_3$ to the rare earth solution before precipitation. This sample had the same inferior crystal development and optical properties as sample 1. In samples 5 and 9 the LiOH used for the caustic treatment contains a small amount of NaOH as impurity (less than 1 percent by weight) which account for the sodium retention.

Samples 3 and 4 illustrate the sodium retention of two typical caustic treated phosphors, each being substantially higher than the sodium retentions of the non-caustic treated samples 1 and 2. In sample 1, the sodium therein was due to sodium impurities in the starting materials or to the contamination in subsequent process whereas in sample 2 the sodium was purposefully introduced thereto.

While the exact bonding of the retained alkali in the phosphor is uncertain, the beneficial results in terms of higher optical efficiency (brighter) with controlled crystal growth are quite apparent as illustrated in the following examples:

EXAMPLE I $Gd_2O_3$ (99.9 percent quality) was dissolved in hydrochloric acid to prepare a 0.6 molar solution and the pH of the final solution was adjusted to about 2 (using ammonium hydroxide when needed). $Eu_2O_3$ (99.9 percent quality) was dissolved in hydrochloric acid to prepare a 1.0 molar solution and the pH of the final solution was similarly adjusted to about 2. Gd and Eu solutions equivalent to 450 grams of mixed oxides at about 6 mol percent $Eu_2O_3$ were mixed and the temperature was adjusted to 30°C. While stirring, a 20 percent excess of a 10 percent oxalic acid was added to the Gd-Eu mixed solution at a steady rate over an 8-minute period and stirring was continued for 10 minutes.

The coprecipitates were filtered and washed with water. The washed coprecipitates were reslurried in 2250 milliliters of water in which were added 450 milliliters of 25 percent by weight NaOH solution. The resultant slurry was stirred intermittently for a period of 1 hour. The caustic treated crystals were recovered by filtration, followed by washing with water. The washed crystals were dried for 16 hours at 300°F. and were fired for 1 hour at 1300°F. The temperature was raised to 2150°F. and was maintained at that temperature for 3 hours.

The fired crystals in the form of loosely held agglomerates were wet milled gently with water for 40 minutes. Thereafter the wet crystals were wet sieved to remove uncomminuted agglomerates and were washed and dried. The wet milled and dried crystals were refired for 2 hours at 1600°F.

The photomicrogram of the europium activated gadolinium oxide of Example I is shown in FIG. 1. The small division of the scale appearing thereon is equal to 3.1 microns.

In a control sample, the phosphors were prepared in the identical manner as described hereinabove with the exception that caustic treatment was omitted. The resultant crystals are shown in FIG. 2 of the accompanying drawing.

Caustic treated and untreated phosphors were coated on a conventional cathode tube and were tested for brightness. It was found that the caustic treated phosphor was 11 to 16 percent brighter than the untreated material under comparable operating conditions. An untreated sample which showed only 89 percent of the brightness of the caustic control was on the average only about 20 percent as large in crystal size. When a portion of this untreated sample was refired at a higher temperature and for a longer period, the crystal size grew to 61 percent of that of the treated sample, but the brightness dropped to 42 percent. It is apparent that without caustic treatment preparation of phosphors with properly combined properties was not feasible.

EXAMPLE II

The oxalate precipitate prepared in a manner similar to Example I was treated with a LiOH solution containing a small amount of NaOH impurity therein. After treatment, the phosphor was prepared in the same manner as in Example I. The phosphor obtained has a greater crystal growth as shown in FIG. 3 of the accompanying drawings.

EXAMPLE III $Y_2O_3$ (99.9 percent quality) was dissolved in hydrochloric acid and the resultant solution was adjusted to pH 2, to make up a 0.6 molar solution. Yttrium and europium solutions equivalent to 450 grams of mixed oxide at 5 mol percent $Eu_2O_3$ were mixed and the temperature was adjusted to 30°C. While stirring a 20 percent excess of a 10 percent oxalic acid was added thereto at a steady rate over a 13-minute period and the stirring was continued for an additional 10 minutes. The precipitates were filtered and washed with water. The recovered precipitates were reslurried in 2250 ml. water and into which were added under constant stirring 450 ml. 20% LiOH plus 99 ml. 25% NaOH. Over a period of 1 hour the slurry was stirred occasionally. After filtration, the phosphor was dried for 16 hours at 260°F. After drying it was fired in air for 1 hour at 1300°F. and an additional 3 hours at 2150°F. The fired phosphor was wet milled, sieved and dried and thereafter it was refired at 1600°F. for a 2-hour period.

The caustic treatment process is not limited to those rare earth salts prepared by precipitation. An oxide prepared by decomposing gadolinium sulfate crystals which had been caustic treated also showed desirable crystal growth and size distribution while an untreated portion of the salt showed poor crystallinity.

In addition to the above specifically described phosphors, other oxide phosphors may be prepared using the process of this invention. For the europium activated phosphors in general, they can be represented by the general formula

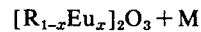

$$[R_{1-x}Eu_x]_2O_3 + M$$

wherein R is at least one rare earth element selected from the group consisting of scandium, yttrium, lanthanum, gadolinium and lutetium, $x$ is 0.02 to 0.1 and M is retained alkali metal or metals in the rare earth matrix, generally below about 0.5 percent by weight of the phosphor.

It is known that efficiency of rare earth phosphors can be affected by addition of certain rare earth impurities, usually in trace amounts, the effect being favorable in some cases and unfavorable in others. These trace effects may be significant even in amounts commonly found in commercial high grade rare earth compounds. Samarium has long been known to produce emission on the red side of the spectrum in a wide variety of phosphors. Certain non-rare earth elements (such as bismuth which produces red emission in a number of phosphors) are known also to be hyperactive. Trace amounts are usually incorporated without gross effect on structure such as could be revealed by X-ray diffraction analysis. Our basic process for the rare earth oxide phosphors has advantages over prior art whether or not trace impurities are present.

We claim:

1. A method for preparing a rare earth oxide phosphor which comprises:

treating an intimate mixture of a salt of a rare earth metal selected from the group consisting of lanthanum, gadolinium, lutetium, yttrium and scandium and a rare earth activator selected from the group consisting of praseodymium, neodymium, samarium, europium, gadolinium, terbium, dysprosium, holmium, erbium, ytterbium, and thulium, said salt being capable of being decomposed to form corresponding rare earth oxide a. with an alkali metal caustic solution containing from about 5 percent to 35 percent alkali by weight of said rare earth oxide b. at a temperature of about 10°C to 70°C for about 20 minutes to 5 hours, firing the caustic treated salt in an essentially non-reducing atmosphere to decompose said salt to form said oxide phosphor; and thereafter refiring the dry oxide to above about 1000°F.

2. A method according to claim 1 wherein prior to refiring, the fired rare earth oxide phosphor is comminuted, washed and dried.

3. A method according to claim 1 wherein the caustic solution is at least one of a group consisting of LiOH, NaOH and KOH solutions.

4. A method for preparing a rare earth oxide phosphor which comprises:

preparing a homogeneous solution of a salt of a rare earth metal selected from the group consisting of lanthanum, gadolinium, lutetium, yttrium and scandium and a salt of a rare earth activator selected from the group consisting of praseodymium, neodymium, samarium, europium, gadolinium, terbium, dysprosium, holmium, erbium, ytterbium, and thulium; coprecipitating a salt of said rare earth metal with said activator, said coprecipitate being capable of being decomposed to form corresponding rare earth oxides; recovering the precipitates; treating the precipitates thus recovered at a temperature of about 10°C to 70°C for about 20 minutes to 5 hours with an alkali metal caustic solution containing from about 5 percent to 35 percent alkali by weight of said rare earth oxides;

firing the caustic treated precipitates in an essentially non-reducing atmosphere to form said oxide phosphor; and thereafter refiring the dry oxide to above about 1000°F.

5. A method according to claim 4 wherein prior to refiring, the fired rare earth oxide phosphor is comminuted, washed and dried.

6. A method according to claim 4 wherein the caustic solution is at least one of a group consisting of LiOH, NaOH and KOH solutions.

7. A method for preparing a rare earth oxide phosphor which comprises:

preparing an acid solution of at least one salt of a rare earth metal selected from the group consisting of lanthanum, gadolinium, lutetium, yttrium and scandium and a salt of a rare earth activator selected from the group consisting of praseodymium, neodymium, samarium, europium, gadolinium, terbium, dysprosium, holmium, erbium, ytterbium, and thulium; coprecipitating said rare earth metal with said activator in the form of oxalates or tartrates at a pH below about that required to precipitate the rare earth metal in hydroxide form, said precipitate being capable of being decomposed to corresponding rare earth oxides;

recovering the precipitate;

treating the precipitate, at a temperature from about 10°C to 70°C for about 20 minutes to 5 hours with an alkali metal caustic solution containing from about 5 percent to 35 percent alkali by weight of said rare earth oxides;

firing the thus treated precipitate in an essentially non-reducing atmosphere to form said oxide phosphor and thereafter refiring the dried oxide to above about 1000°F.

8. A method according to claim 7 wherein prior to refiring, the fired rare earth oxide phosphor is wet milled, washed and dried.

9. A method according to claim 7 wherein the rare earth metal is yttrium, gadolinium or a mixture thereof.

10. A method according to claim 9 wherein the activator is europium.

11. A method according to claim 9 wherein yttrium, gadolinium or a mixture thereof is coprecipitated with the activator as oxalates and the oxalate thus recovered is treated with a caustic solution containing NaOH, KOH or LiOH or a mixture thereof.

12. A method according to claim 11 wherein prior to refiring, the fired rare earth oxide phosphor is wet milled, washed and dried.

* * * * *